(12) United States Patent
Yeo et al.

(10) Patent No.: US 11,851,310 B2
(45) Date of Patent: Dec. 26, 2023

(54) AUTONOMOUS FORKLIFT TRUCK

(71) Applicant: Hyundai Construction Equipment Co., Ltd., Seoul (KR)

(72) Inventors: Joon Hyeok Yeo, Seoul (KR); Jong Hyun Hwang, Seoul (KR); Moon Su Park, Seoul (KR); Young Rae Cho, Seoul (KR); Su Hyeon Gim, Seoul (KR)

(73) Assignee: HD Hyundai Xitesolution Co., Ltd., Seongnam-si (KR)

( * ) Notice: Subject to any disclaimer, the term of this patent is extended or adjusted under 35 U.S.C. 154(b) by 211 days.

(21) Appl. No.: 17/228,009

(22) Filed: Apr. 12, 2021

(65) Prior Publication Data

US 2021/0316975 A1  Oct. 14, 2021

(30) Foreign Application Priority Data

Apr. 13, 2020 (KR) .................. 10-2020-0044812
Feb. 1, 2021 (KR) .................. 10-2021-0013961

(51) Int. Cl.
*B66F 9/06* (2006.01)
*B66F 9/075* (2006.01)
(Continued)

(52) U.S. Cl.
CPC ............ *B66F 9/063* (2013.01); *B66F 9/0755* (2013.01); *G01S 17/931* (2020.01);
(Continued)

(58) Field of Classification Search
CPC ...... B66F 9/063; B66F 9/0755; G01S 17/931; G01S 17/42; G05D 1/0088; G05D 1/0225;
(Continued)

(56) References Cited

U.S. PATENT DOCUMENTS

2018/0113468 A1* 4/2018 Russell ............... G05D 1/0094
2018/0312382 A1  11/2018 Kim et al.
(Continued)

FOREIGN PATENT DOCUMENTS

JP      2003-267692 A     9/2003
KR  20-1999-0038062 U    10/1999
(Continued)

OTHER PUBLICATIONS

KR20150105930A.*
(Continued)

*Primary Examiner* — Tyler J Lee
*Assistant Examiner* — Yufeng Zhang
(74) *Attorney, Agent, or Firm* — BLANK ROME LLP

(57) ABSTRACT

The present disclosure relates to an autonomous forklift truck capable of recognizing a location of the autonomous forklift truck and a location of an obstacle in a work area, and the truck includes a location recognition sensor to detect the location of the autonomous forklift truck through a laser emitted and reflected from a reflective marking equipped in a structure, a first sensor to detect an obstacle near a work area floor, a second sensor to detect an obstacle at a predetermined height from the floor, a fork laser sensor to measure a distance from a rack where a pallet is loaded or a distance from the pallet, a first fork photoelectric sensor and a second fork photoelectric sensor, and a control unit to process sensing signals inputted from all the sensors and control the driving and attachments of the autonomous forklift truck.

9 Claims, 9 Drawing Sheets

(51) Int. Cl.
  *G05D 1/02* (2020.01)
  *G01S 17/931* (2020.01)
  *G05D 1/00* (2006.01)

(52) U.S. Cl.
  CPC ......... *G05D 1/0088* (2013.01); *G05D 1/0225* (2013.01); *G05D 1/0236* (2013.01); *G05D 1/0274* (2013.01); *G05D 2201/0216* (2013.01)

(58) Field of Classification Search
  CPC ............... G05D 1/0236; G05D 1/0274; G05D 2201/0216; G05D 1/0244; G05D 1/024
  See application file for complete search history.

(56) References Cited

U.S. PATENT DOCUMENTS

| | | | |
|---|---|---|---|
| 2020/0317483 A1* | 10/2020 | Paterson, Jr. | ........... B66F 9/144 |
| 2020/0407929 A1* | 12/2020 | Falchetti | ............... E01C 23/163 |
| 2021/0039931 A1* | 2/2021 | Kawauchi | ............... B66F 9/063 |
| 2022/0189055 A1* | 6/2022 | Kita | ........................ G06V 20/56 |

FOREIGN PATENT DOCUMENTS

| | | |
|---|---|---|
| KR | 10-2015-0105930 A | 9/2015 |
| KR | 10-1784567 B1 | 10/2017 |
| KR | 10-2018-0120982 A | 11/2018 |

OTHER PUBLICATIONS

Lecking et al., Variable Pallet Pick-Up for Automatic Guided Vehicles in Industrial Environments, Sep. 2006, ResearchGate, DOI: 10.1109/ETFA.2006.355424 (Year: 2006).*

* cited by examiner

AUTONOMOUS FORKLIFT TRUCK

CROSS-REFERENCE TO RELATED APPLICATIONS

This application claims priority to Korean Patent Application No. 10-2020-0044812 filed on Apr. 13, 2020 and Korean Patent Application No. 10-2021-0013961 filed on Feb. 1, 2021, and all the benefits accruing therefrom under 35 U.S.C. § 119, the contents of which in its entirety are herein incorporated by reference.

BACKGROUND

1. Field

The present disclosure relates to an automated forklift truck, and more particularly, to an autonomous forklift truck capable of automatically performing transporting and unloading tasks by a computer and a network system while a human will not be sitting or manipulating in person.

2. Description of the Related Art

With the trend toward automated and unmanned production systems in transportation industry, there is an increasing use of Autonomous Guided Vehicles (AGV) responsible for transporting products within buildings and factories. Autonomous forklift trucks require the ability to autonomously make decisions and accurate and safe work capability in any work environment. Due to these features, as opposed to the existing unmanned transport vehicles having the limited work area or the limited capability for the travel/transport, autonomous forklift trucks have flexibility into a variety of work environments. By these reasons, autonomous forklift trucks may be used in harmful environments that are difficult for humans to access, and may be used to automate freight transport and unloading (material handling) in the existing warehouse systems.

Additionally, recently many studies are being made in the sector of element technologies such as surrounding environment recognition, path planning, collision avoidance and location recognition to realize intelligent autonomous forklift trucks.

Autonomous forklift trucks need the location recognition technique to periodically detect the current location while moving, and also need the function of detecting fixed or moving obstacles themselves and re-generating proper paths to avoid collisions with the obstacles. Through these functions, the autonomous forklift trucks autonomously make decisions, travel and perform given tasks without human intervention. Accordingly, it is possible to increase the efficiency without replacing or changing production lines. Additionally, the autonomous forklift trucks have their own power source and perform repetitive tasks precisely and safely for accuracy of transportation, and are now used in many industrial sectors. As a variety of methods for development/application of the autonomous forklift trucks and their implementation have been studied and the industrial effectiveness and economic effects of the autonomous forklift trucks are verified from the studies, the range of industrial applications of the autonomous forklift trucks using the same is gradually expanding. However, the autonomous operation of the autonomous forklift trucks through the full and complete understanding of the work environment is still challenging.

SUMMARY

The present disclosure is directed to providing an autonomous forklift truck capable of automating transporting and unloading tasks in a work space within a work area.

To achieve the above-described object, an autonomous forklift truck according to the present disclosure includes a location recognition sensor equipped on top of the autonomous forklift truck to emit a laser and detect a location of the autonomous forklift truck in a traveling operation and a rotating operation of the autonomous forklift truck through a laser scan for a laser reflected by a reflective marking equipped in a structure defining a space of a work area or a laser reflected by a fixed indoor geometrical feature; a third sensor equipped on each of left and right sides of the autonomous forklift truck to detect whether there is an obstacle on a path of rotation during the rotating operation of the autonomous forklift truck, and detect two rack beams and guide a location where a pallet will be unloaded during an unloading operation; a fork laser sensor equipped at a location of a lift between two cantilevers that constitute a fork to measure a distance from a rack where the pallet is loaded or a distance from the pallet and emit a laser to a reflective marking for pallet hole detection equipped in the pallet and receive <location information and reflectance data> of a reflected laser in a loading operation; and a control unit to process sensing signals inputted from all the sensors equipped in a front part and a rear part of the autonomous forklift truck and control a traveling operation, a rotating operation, a loading operation and an unloading operation of the autonomous forklift truck via connection with an autonomous forklift truck control server.

The fork laser sensor receives a plurality of <location information and reflectance data> by repeatedly emitting the laser to the pallet having the reflective marking for pallet hole detection within a predetermined time, the location information is 2-dimensional coordinate information of the location to which the laser is emitted, the reflectance data is quantitative contrast data of the location to which the laser is emitted, the location information of the location to which the laser is emitted is received together for each reflectance data, and the control unit calculates a location information average by averaging the location information of each reflectance data for reflectance data of a predetermined reference value or above and identifies the calculated location information average as a location where the reflective marking for pallet hole detection is disposed.

The third sensor equipped on each of the left and right sides of the autonomous forklift truck detects the two rack beams in the unloading operation, and the control unit identifies a location of the rack between the rack beams where the pallet will be loaded based on location information of the rack beams detected by the third sensor.

The traveling operation includes a step of receiving, by the control unit, design map based destination node information necessary to travel from the autonomous forklift truck control server, a step of generating, by the control unit, a path to a destination node on a design map based on the received destination node information, and a step of controlling, by the control unit, a driving motor and a steering motor of the autonomous forklift truck to move the autonomous forklift truck along the generated path.

The rotating operation includes a step of receiving, by the control unit, angle of arrival information from the autonomous forklift truck control server, and a step of controlling, by the control unit, a steering motor based on the angle of arrival information to rotate the autonomous forklift truck by an angle of arrival, and the presence or absence of an obstacle on the path of rotation during the rotating operation of the autonomous forklift truck is detected by the third sensor.

The loading operation includes a step of receiving, by the control unit, rack height information of a location where the pallet is loaded from the autonomous forklift truck control server, a step of detecting a location of a pallet hole, a step of moving the fork leftward and rightward and adjusting a spacing between the two cantilevers that constitute the fork to place the fork in the pallet hole, and a step of measuring a distance between the fork and the pallet hole using the fork laser sensor and inserting the fork into the pallet hole by moving the fork forward based on the measured distance, and the step of detecting the location of the pallet hole includes receiving, by the fork laser sensor, a plurality of <location information and reflectance data> by repeatedly emitting the laser to the pallet having the reflective marking for pallet hole detection within a predetermined time, and calculating, by the control unit, a location information average by averaging the location information of each reflectance data for the reflectance data of a predetermined reference value or above and identifying the calculated location information average as a location where the reflective marking for pallet hole detection is disposed.

The unloading operation includes a step of receiving, by the control unit of the autonomous forklift truck, rack height information from the autonomous forklift truck control server and raising the lift to the corresponding rack height based on the received rack height information, a step of identifying a location of the rack where the pallet will be loaded, a step of measuring, by the control unit, a distance between the autonomous forklift truck and the rack beam through the third sensor when the location of the rack where the pallet will be loaded is identified and moving the fork leftward, rightward and forward based on the measured distance to place the fork on the rack where the pallet will be loaded, and a step of loading the pallet onto the rack by lowering the lift, and the step of identifying the location of the rack where the pallet will be loaded includes detecting the two rack beams by the third sensor equipped on each of the left and right sides of the autonomous forklift truck, and identifying, by the control unit, the location of the rack between the rack beams where the pallet will be loaded based on the location information of the rack beams detected by the third sensor.

The autonomous forklift truck may further include a first sensor equipped on bottom of the front part of the autonomous forklift truck to detect an obstacle near a work area floor; and a second sensor equipped on top of the front part of the autonomous forklift truck to detect an obstacle at a predetermined height from the floor.

The autonomous forklift truck further includes a first fork photoelectric sensor and a second fork photoelectric sensor equipped on a front side of each of the cantilevers that constitute the fork, the first fork photoelectric sensor is positioned at a center of an attachment, the second fork photoelectric sensor is positioned on an outer side of the attachment, the first fork photoelectric sensor detects whether there is a pallet hole in the loading operation, and the second fork photoelectric sensor detects whether there is an obstacle in front of the fork during forward movement of the fork in the unloading operation.

The autonomous forklift truck may further include a first wire sensor to measure a height of the lift, a second wire sensor to measure a shifted location when the two cantilevers are shifted leftward or rightward, and a third wire sensor to measure a forward movement distance of the fork.

The autonomous forklift truck according to the present disclosure has effects as follows: It is possible to accurately recognize the location and direction in the work area, thereby improving the work stability for racks and pallets in the freight loading, handling and unloading tasks.

DETAILED DESCRIPTION

Figure 1:
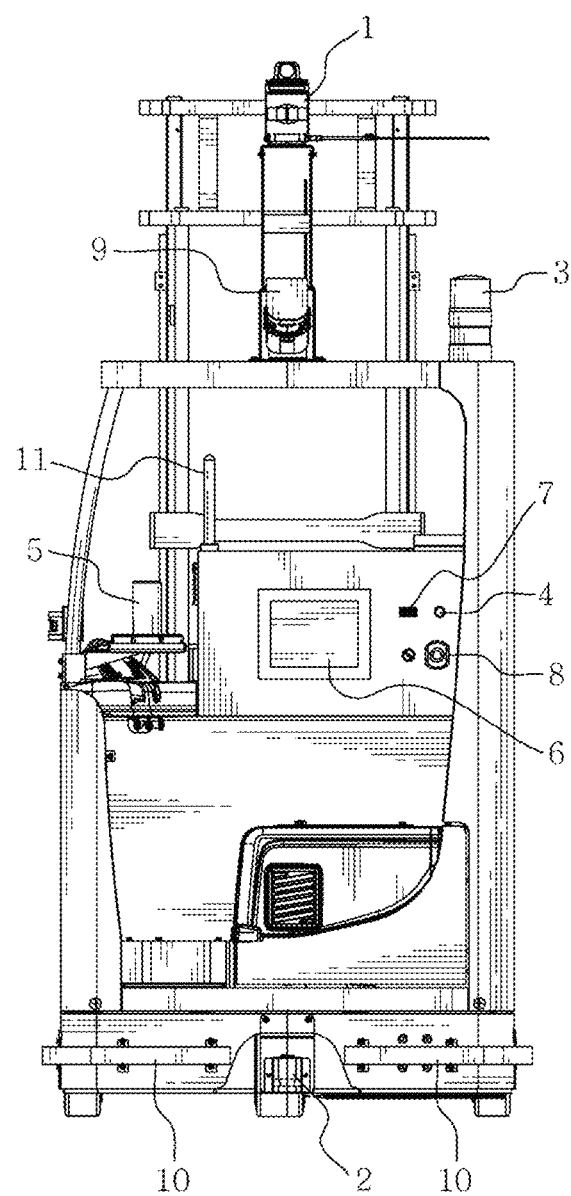
FIGS. 1 and 2 are reference diagrams showing a front part of an autonomous forklift truck according to an embodiment of the present disclosure.
Figure 2:
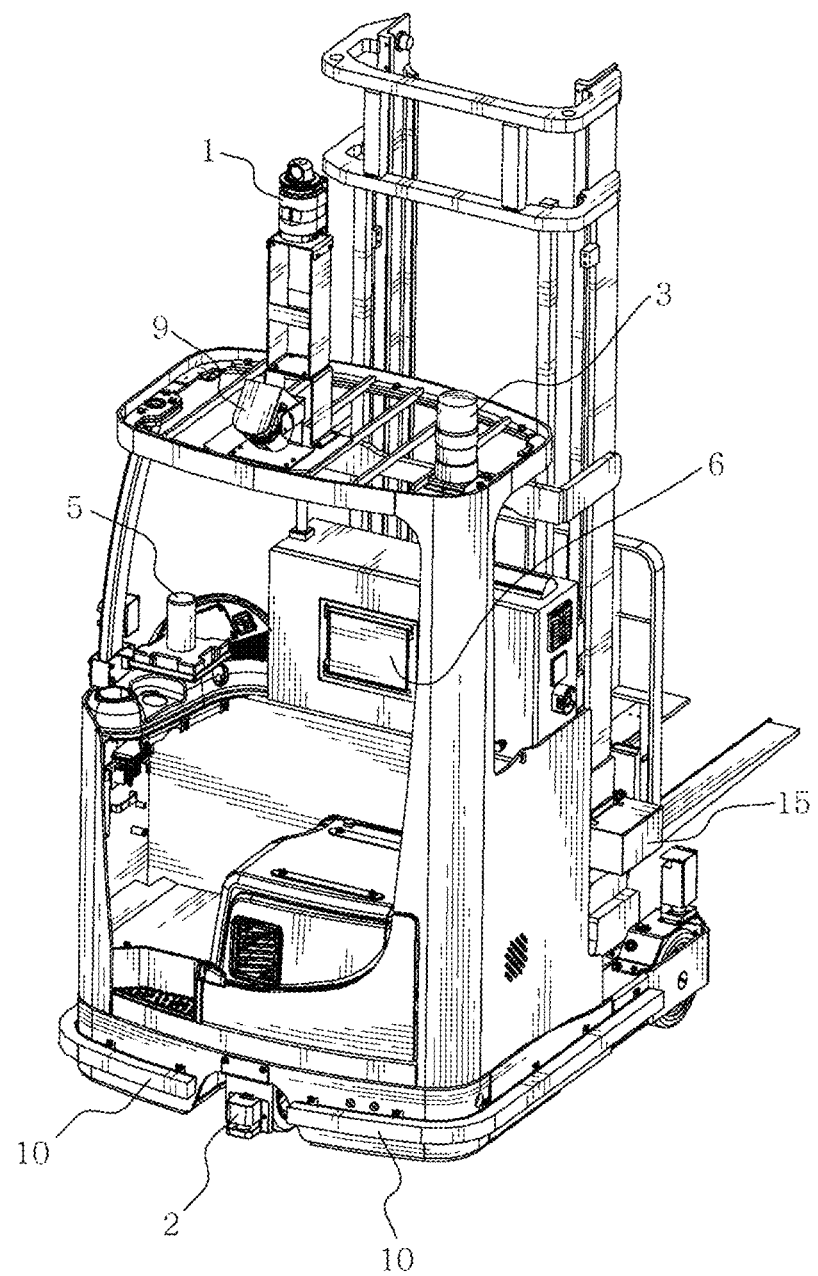
Figure 3:
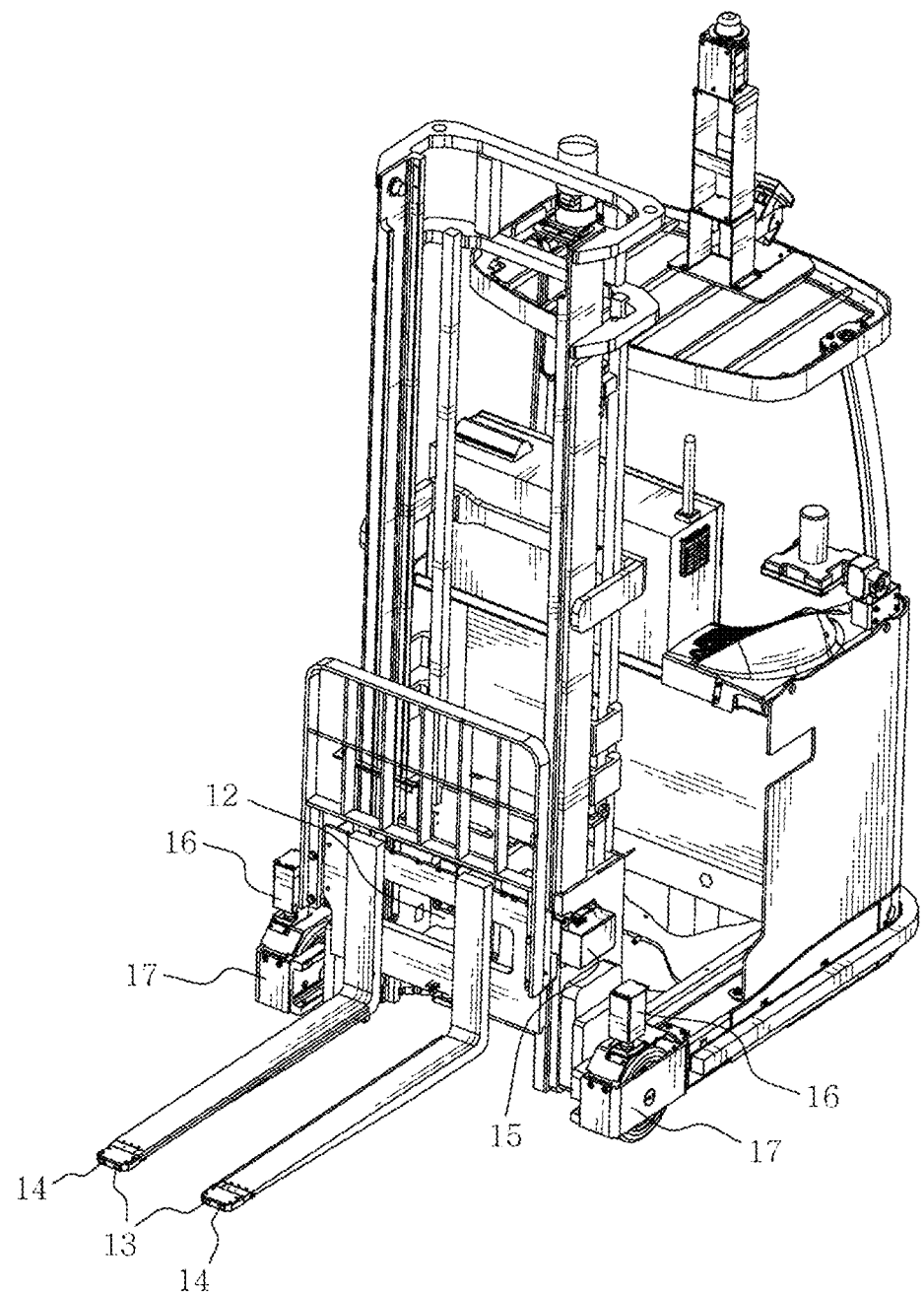
FIGS. 3 and 4 are reference diagrams showing a rear part of an autonomous forklift truck according to an embodiment of the present disclosure.
Figure 4:
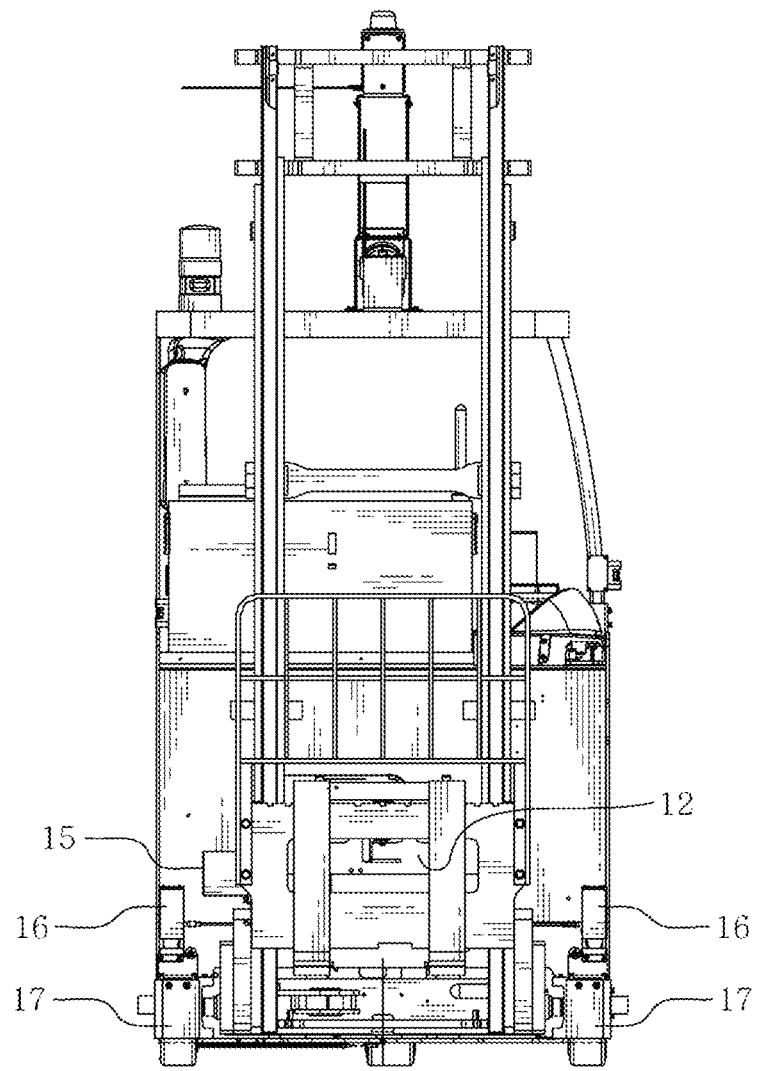

The present disclosure proposes technology about an autonomous forklift truck with improved work stability by accurately recognizing its location in a work area and accurately measuring the distance from an obstacle based on a plurality of LiDAR sensors during freight loading, handling and unloading.

Hereinafter, an autonomous forklift truck according to an embodiment of the present disclosure will be described in detail with reference to the accompanying drawings.

Referring to FIGS. 1 to 4, the autonomous forklift truck according to an embodiment of the present disclosure includes a plurality of sensors, and a control unit (not shown) to process sensing signals inputted from the sensors and control the driving and attachments of the autonomous forklift truck.

The plurality of sensors equipped in the autonomous forklift truck generates a sensing signal for recognizing the location of the autonomous forklift truck in the work area, and a sensing signal for measuring the distance from an obstacle and an object in the surroundings during operation.

The autonomous forklift truck is divided into a rear part where the attachments are equipped and a front part opposite the rear part, and the plurality of sensors described above is equipped in the front part and the rear part of the autonomous forklift truck, and according to the function of each sensor, the sensor is mounted in the front part or the rear part of the autonomous forklift truck. In the specification, the front part direction of the autonomous forklift truck refers to the direction of travel, and the rear part direction of the autonomous forklift truck refers to the rearward direction.

To begin with, the sensors mounted in the front part of the autonomous forklift truck is described as follows. A location recognition sensor 1 is equipped on top of the front part of the autonomous forklift truck. The location recognition sensor 1 is used to detect the location of the autonomous forklift truck in the work area, and may be LiDAR. In detail, the LiDAR may include a laser transmitter, a receiver and an operation and data processing module.

For the autonomous forklift truck to detect its location, in addition to the LiDAR, reflective markings that reflect a laser are necessary, and the reflective markings are arranged in a structure defining the space of the work area at an interval of a few meters to a few tens of meters. During the travel of the autonomous forklift truck, the location recognition sensor 1 of the autonomous forklift truck continuously emits a laser, and the location of the autonomous forklift truck may be detected through the laser reflected from the reflective markings equipped in the structure defining the space of the work area. Additionally, this technology may be implemented without needing to install and set the reflective markings, and may be enabled through location recognition processing in a computer through information about a design map created based on boundary walls and fixed structures of an indoor warehouse.

Subsequently, a first sensor 2 and a second sensor 9 are equipped on the bottom and top in the front part of the autonomous forklift truck, respectively. The first sensor 2 equipped on the bottom in the front part of the autonomous forklift truck is equipped on one side of a front shock bumper of the autonomous forklift truck, and plays a role in detecting an obstacle near the work area floor. Additionally, the second sensor 9 equipped on the top in the front part of the autonomous forklift truck plays a role in detecting an obstacle at a predetermined height from the floor not detected by the first sensor 2. In an embodiment of the present disclosure, when an obstacle near the floor is detected within 100 to 200 cm by the first sensor 2, the autonomous forklift truck may be brought to an emergency stop, and when an obstacle disposed at the height of less than 1 m is detected by the second sensor 9, the autonomous forklift truck may be brought to an emergency stop.

Additionally, a warning lamp 3 and an alarm lamp 4 may be equipped on one side of the front part of the autonomous forklift truck. When an obstacle is detected by the first sensor or the second sensor 9 during travel, the warning lamp 3 generates a warning sound, and the alarm lamp 4 displays green light during the normal operation of the autonomous forklift truck, yellow light when caution is required, and red light when an error occurs. Along with this, a wireless transmitter/receiver system 11 may be equipped on one side of the front part of the autonomous forklift truck for communication with an autonomous forklift truck control server, and a touchscreen display 6 may be equipped to detect the operational condition and the current task status of the autonomous forklift truck. Furthermore, a manual/automatic manipulation switch 7 for shifting manual driving and automatic driving, an emergency stop switch 8 for emergency stop, a joystick 5 for manual driving and the front shock bumper 10 may be equipped. Additionally, a rechargeable battery charging system (not shown) is equipped on one side of the autonomous forklift truck.

The sensors mounted in the rear part of the autonomous forklift truck are as follows. The sensors mounted in the rear part of the autonomous forklift truck generate sensing signals associated with the operation of the attachments of the autonomous forklift truck. The attachments of the autonomous forklift truck are largely divided into a lift and a fork. The lift may be a structure that vertically extends to a predetermined length like a ladder structure of a ladder vehicle, and the fork includes two cantilevers arranged side by side in the form of chopsticks, is fixed to one side of the lift and moves with upward and downward movements of the lift. The freight, for example, the pallet may be loaded onto the fork, or the pallet may be unloaded from the reach.

For freight loading and unloading, not only can the fork move up and down with the lift but also move back and forth.

As described above, the fork includes the two cantilevers arranged side by side, and a fork laser sensor 12 is equipped at a location of the lift between the two cantilevers. The fork laser sensor 12 plays a role in measuring the distance from the rack where the pallet is loaded or the distance from the pallet, and the laser scan layer of the fork laser sensor 12 is preferably positioned on the plane in the height range between a few mm and less than 1 cm with respect to the upper surface of the two cantilevers of the fork. When the fork enters pallet holes for loading the pallet, the fork laser sensor 12 plays a role in detecting the pallet holes or the pallet center through analysis and algorithm processing of reflected laser points, and inducing the two fork cantilevers to safely enter the pallet holes. The pallet hole detection by the fork laser sensor 12 is performed based on <location information and reflectance data>, and it will be described in detail in the description of 'loading operation' below.

Additionally, a first fork photoelectric sensor 13 and a second fork photoelectric sensor 14 are equipped on the front side of each cantilever of the fork. The first fork photoelectric sensor 13 is equipped on the inner side, and the second fork photoelectric sensor 14 is equipped on the outer side. Here, the first fork photoelectric sensor 13 and the second fork photoelectric sensor 14 are placed on the same line. In the specification, the inner side of the first fork photoelectric sensor 13 refers to a direction toward the center of the attachments, and the outer side of the first fork photoelectric sensor 13 refers to an outward direction of the attachments.

The first fork photoelectric sensor 13 is a sensor capable of on/off output through obstacle detection distance settings. For the purpose of safety, the first fork photoelectric sensor 13 is used for the procedure of checking again whether there is an obstacle encountered when the fork enters the pallet holes in the loading task or whether any cargo already exists in a target rack space immediately before loading the pallet onto the rack in the unloading task, according to the work environment. Of the two photoelectric sensors placed in each cantilever, the outer one detects whether loading is replicated by setting the distance sensitivity to 1 m or more. The inner one detects the pallet hole entry safety by setting the distance sensitivity to less than 10 cm. That is, the second fork photoelectric sensor 14 plays a role in detecting whether there is an obstacle ahead when the fork moves forward to load the pallet. When an obstacle is detected by the second fork photoelectric sensor 14, the autonomous forklift truck is brought to an emergency stop.

A first wire sensor 15, a second wire sensor (not shown) and a third wire sensor (not shown) are equipped. The first wire sensor 15 measures the height of the lift. When the two cantilevers are shifted to the left or right, the second wire sensor measures the shifted location. The third wire sensor measures the frontward movement distance of the fork. The first wire sensor 15, the second wire sensor and the third wire sensor are equipped on one side of the attachments, and in an embodiment, may be equipped on one side of the lift or one side of a mast.

Additionally, a third sensor 16 is equipped on each of left/right rear bumpers 17 in the rear part of the autonomous forklift truck. In unloading the pallet on the fork to the rack, to calculate the movement distance of the autonomous forklift truck to the rack, the rack and rack beams have reflective markings (see FIGS. 10 and 11). The third sensor 16 may emit a laser to the reflective marking with the distance and intensity of the laser scan data, and measure the relative location and direction between the autonomous forklift truck and the rack with robust rack location recognition to prevent misidentification caused by the environment.

The control unit processes the sensing signals inputted from all the sensors equipped in the front part and the rear part of the autonomous forklift truck and controls the driving and the attachments of the autonomous forklift truck via connection with the autonomous forklift truck control server. The control unit transmits the sensing signals inputted from all the above-described sensors mounted in the autonomous forklift truck together with the wireless transmitter/receiver system to the autonomous forklift truck control server through the wireless transmitter/receiver system, and receives map information such as a work path and a control signal associated with the operation of the autonomous forklift truck from the autonomous forklift truck control server.

By the connection between the control unit and the autonomous forklift truck control server, the autonomous forklift truck may largely perform four unit operations, i.e., a traveling operation, a rotating operation, a loading operation and an unloading operation. The autonomous forklift truck can move, and load and unload the pallet through the traveling operation, the rotating operation, the loading operation and the unloading operation.

In each unit operation, the control unit mounted in the autonomous forklift truck receives destination node information necessary to travel, angle of arrival information necessary to rotate, and rack height information necessary to load and unload from the autonomous forklift truck control server, and controls obstacle detection and whether to continue operating based on the sensing signals inputted from all the sensors mounted in the autonomous forklift truck, and each of the four unit operations is performed as described in detail below.

Figure 5:
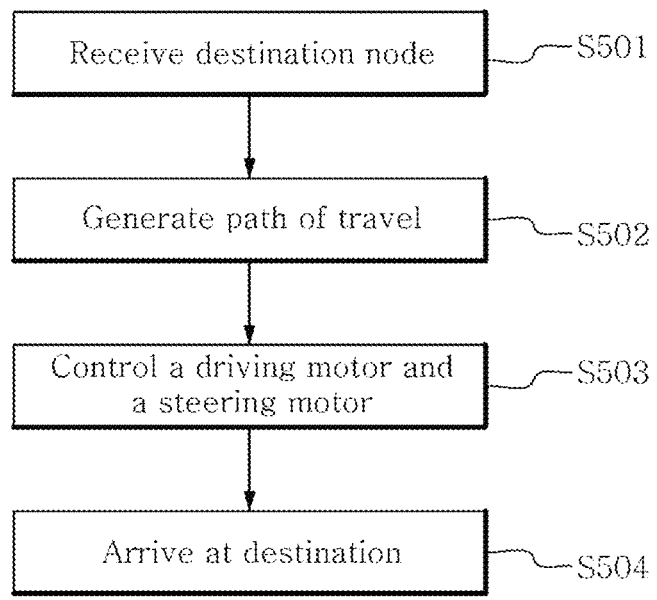
FIG. 5 is a flowchart illustrating a traveling operation.
Figure 6:
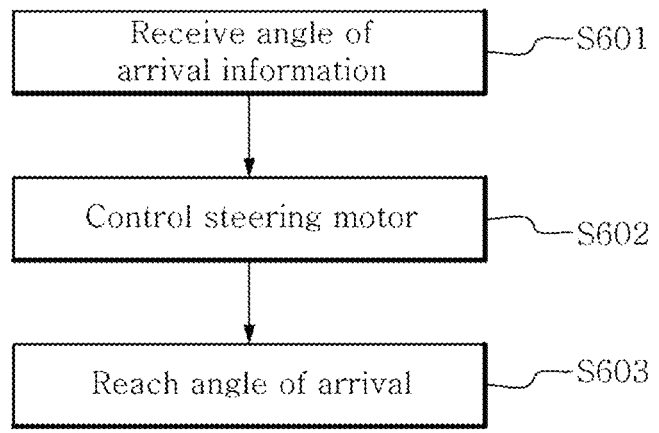
FIG. 6 is a flowchart illustrating a rotating operation.
Figure 7:
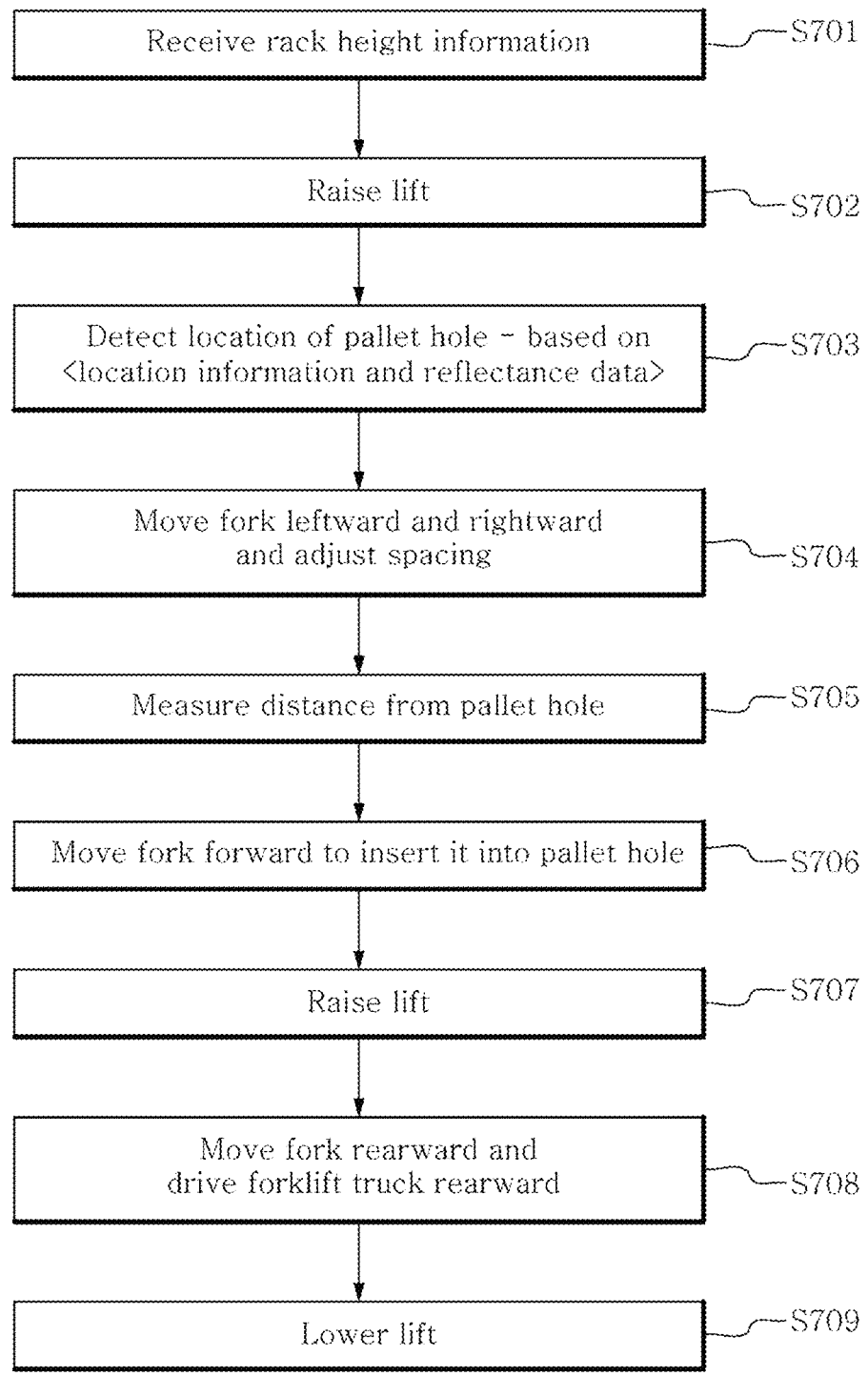
FIG. 7 is a flowchart illustrating a loading operation.
Figure 8:
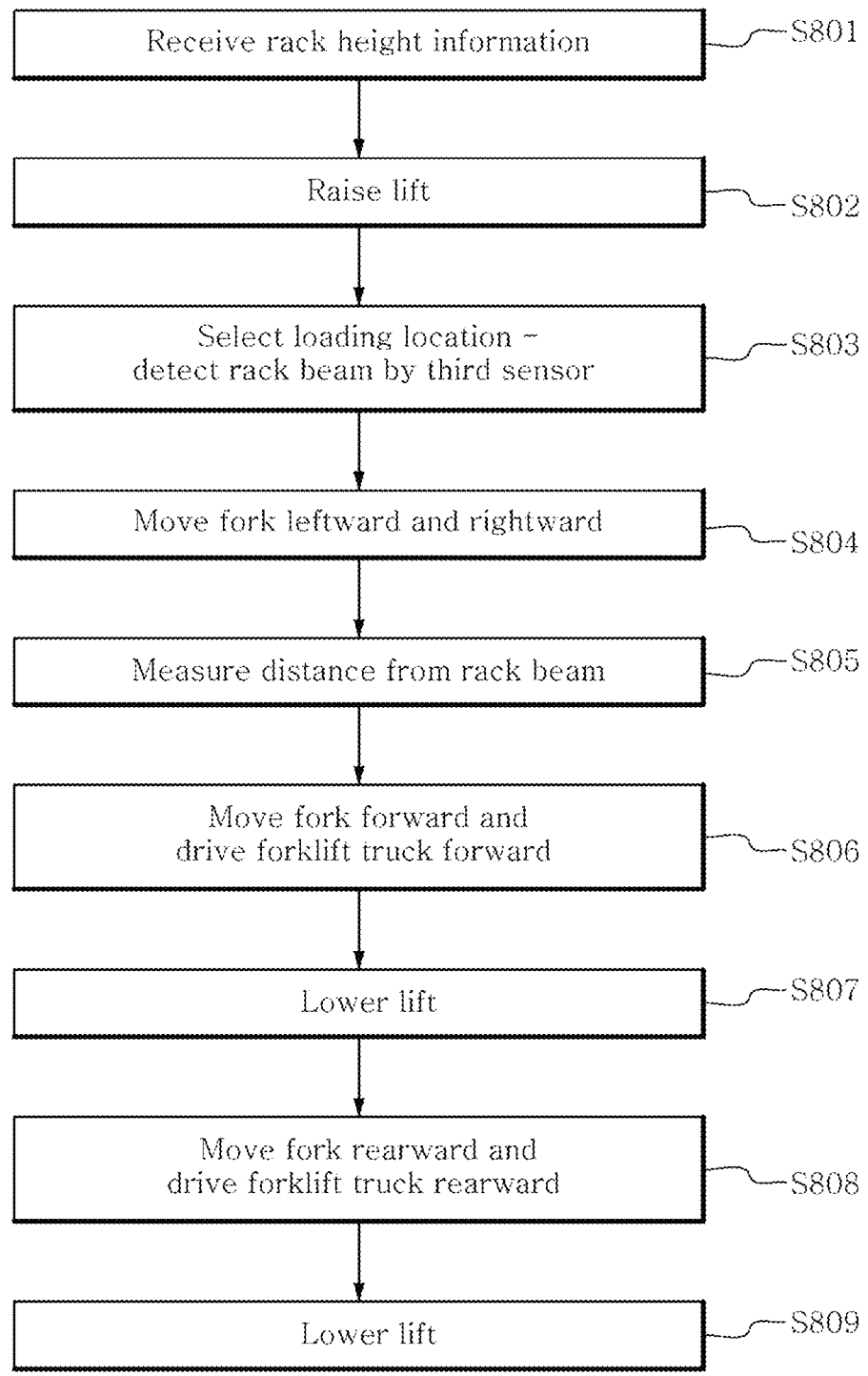
FIG. 8 is a flowchart illustrating an unloading operation.

To begin with, the traveling operation is performed as follows (see FIG. 5).

The control unit mounted in the autonomous forklift truck receives design map based destination node information necessary to travel from the autonomous forklift truck control server (S501). The work area which is the workspace of the autonomous forklift truck is defined as a 2-dimensional design map including a plurality of nodes (points), and the destination node information associated with the final destination of the autonomous forklift truck is generated by the autonomous forklift truck control server and transmitted to the control unit of the autonomous forklift truck.

Figure 9:
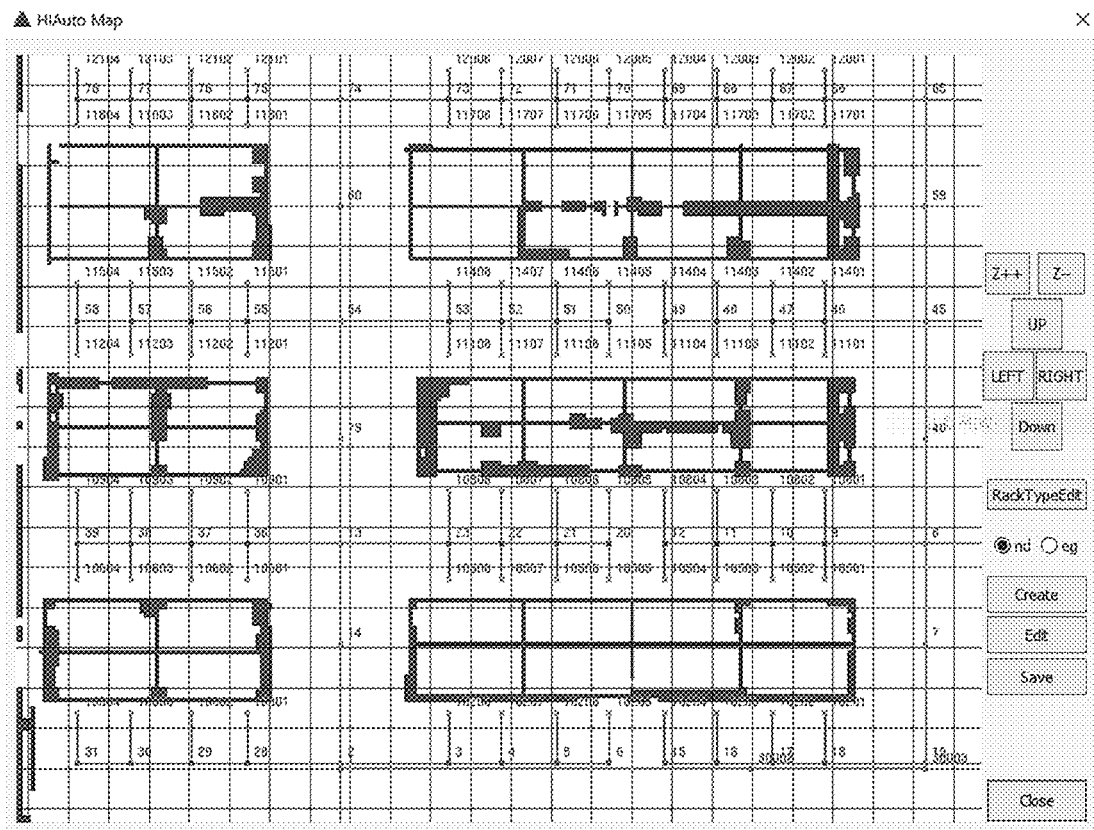
FIG. 9 is a reference diagram showing a usage example of a design map editing task.

The control unit of the autonomous forklift truck generates a path to the destination node on the design map based on the received destination node information (S502) (see FIG. 9). The path to the destination node may be generated using a well-known path finding algorithm, for example, Djikstra algorithm.

The control unit controls a driving motor and a steering motor of the autonomous forklift truck to move the autonomous forklift truck along the generated path (S503) (S504). In this instance, since the generated path connects the nodes, the path is updated each time each node is reached.

When the autonomous forklift truck travels along the generated path, it is necessary to detect whether there is an obstacle, and the autonomous forklift truck continues or stops traveling according to the presence or absence of an obstacle, and the presence or absence of an obstacle during the travel of the autonomous forklift truck is detected by the first sensor 2 and the second sensor 9. As described above, the first sensor 2 is equipped on one side of the front shock bumper 10 of the autonomous forklift truck and plays a role in detecting an obstacle near the work area floor, and the second sensor 9 plays a role in detecting an obstacle at a predetermined height from the floor not detected by the first sensor 2. When an obstacle is detected on the path of travel by the first sensor 2 or the second sensor 9, the control unit temporarily stops the traveling operation of the autonomous forklift truck, and when the obstacle is removed, re-starts the traveling operation.

The rotating operation is performed as follows.

The rotating operation refers to an operation of the autonomous forklift truck rotating in place, and the rotating operation is required when loading or unloading the pallet.

For the rotating operation of the autonomous forklift truck, first, the control unit receives angle of arrival information from the autonomous forklift truck control server (S601). The angle of arrival refers to a target angle of rotation of the autonomous forklift truck.

The control unit rotates the autonomous forklift truck by the angle of arrival by controlling the steering motor based on the angle of arrival information (S602) (S603). While the autonomous forklift truck rotates to the angle of arrival, it is necessary to detect whether there is an obstacle, and the presence or absence of an obstacle during the rotating operation is detected by the third sensor 16. As described above, the third sensor 16 is equipped on each of the left/right rear bumpers 17, and the third sensor 16 equipped on each of the left/right rear bumpers 17 plays a role in detecting an obstacle on the path of rotation when the autonomous forklift truck rotates in the clockwise or counterclockwise direction.

When an obstacle on the path of rotation is detected by the third sensor 16, the control unit temporarily stops the rotating operation of the autonomous forklift truck, and when the obstacle is removed, re-starts the rotating operation.

In addition to detecting an obstacle on the path of rotation, the third sensor 16 also plays a role in recognizing a location at which the pallet is unloaded in the unloading operation, and its detailed description will be provided in the description of the unloading operation below.

The loading task is performed as follows.

The loading task refers to a task of the autonomous forklift truck loading the pallet loaded on the rack onto the fork of the autonomous forklift truck. The unloading task as described below refers to a task of unloading the pallet loaded on the fork of the autonomous forklift truck to the rack. The loading task and the unloading task are performed based on upward and downward movements of the lift and forward and rearward movements of the fork.

For the loading task, height information of the rack where the pallet is loaded is required. The control unit receives rack height information of a location at which the pallet is loaded from the autonomous forklift truck control server (S701).

When the rack height information is received, the control unit raises the lift to the height of the rack (S702). Subsequently, to load the pallet, it is necessary to accurately insert the fork into the pallet holes, and to accurately insert the fork into the pallet holes, it is necessary to accurately detect the location of the pallet holes.

To detect the location of the pallet holes, the present disclosure applies the following method (S703).

Figure 10:
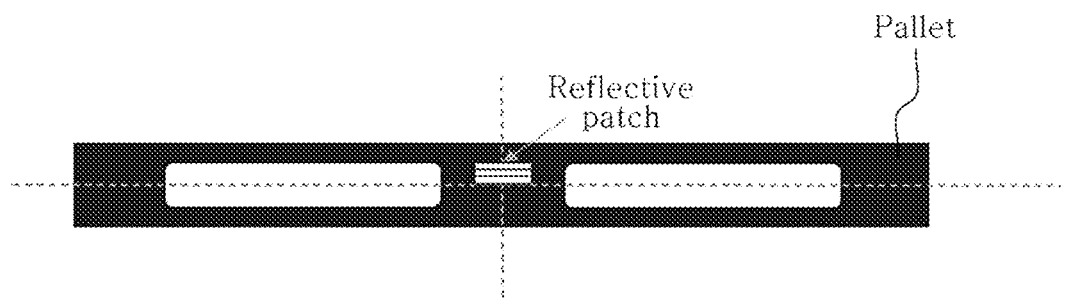
FIG. 10 is a diagram showing a reflective marking equipped in a pallet to detect pallet holes.
Figure 11:
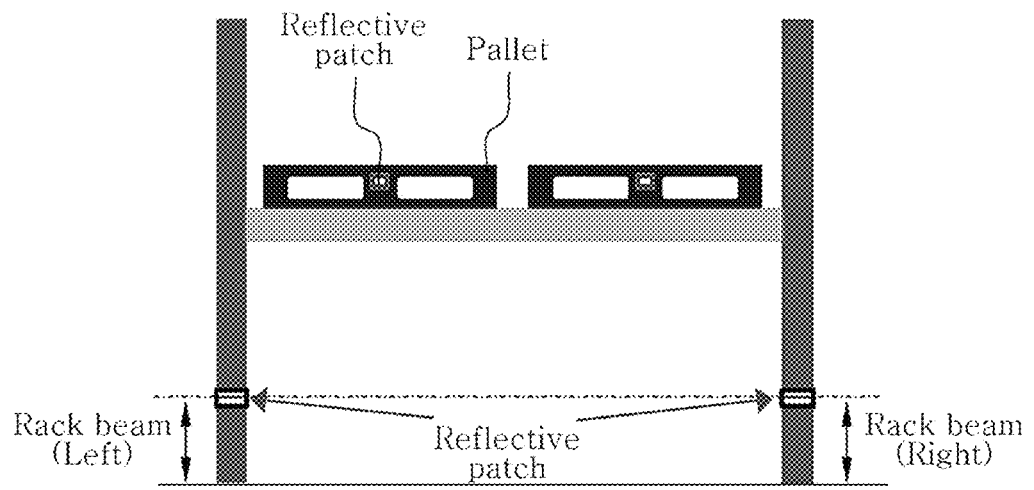
FIG. 11 is a diagram showing reflective markings of rack beams.

The pallet holes are provided at the two lower ends of the pallet, and a reflective marking for pallet hole detection is pre-mounted at the center between the two pallet holes (see FIG. 10). In this state, a step of recognizing the reflective marking for pallet hole detection is performed by the fork laser sensor 12. The fork laser sensor 12 is equipped at the center of the lift in the fork, i.e., between the two cantilevers as described above. As the two cantilevers that constitute the fork are inserted into the two pallet holes and the fork laser sensor 12 is disposed at the center between the two cantilevers, when the fork laser sensor 12 and the reflective marking for pallet hole detection are placed on the same line, the two cantilevers may be accurately inserted into the two pallet holes.

The fork laser sensor 12 emits a laser to the pallet having the reflective marking for pallet hole detection, and receives <location information and reflectance data> through the reflected laser. Here, the location information is 2-dimensional coordinate information of the location to which the laser is emitted, and the reflectance data is contrast data of the location to which the laser is emitted. When one laser emission is performed, the location information and the reflectance data is received. That is, the location information of the location to which the laser is emitted is received together for each reflectance data. The reflectance data is quantitative data, and may be divided into, for example, 0 to 255 by grade. The closer to 0, it is darker, and the closer to 255, it is brighter, and the closer to 255, there is a higher possibility that the location of the emitted laser will be the reflective marking.

The fork laser sensor 12 receives a plurality of <location information and reflectance data> by repeating the laser emission within a predetermined time. The control unit filters the plurality of <location information and reflectance data> received. For example, only reflectance data of 250 or above is remained, and the remaining reflectance data and its location information is deleted. Subsequently, a location information average is calculated by averaging location information of each reflectance data of 250 or above. The calculated location information average is identified as the location at which the reflective marking for pallet hole detection is disposed.

When the location at which the reflective marking for pallet hole detection is disposed is identified through the above-described process, the control unit controls the leftward/rightward movement of the fork and the spacing between the two cantilevers of the fork to place the fork in the pallet holes (S704). Additionally, the control unit measures the distance between the fork and the pallet hole using the fork laser sensor 12 and moves the fork forward based on the measured distance (S705) (S706). In this process, the first wire sensor 15 measures the height of the lift, when the two cantilevers are shifted to the left or right, the second wire sensor measures the shifted location, and the third wire sensor measures the forward movement distance of the fork.

When the fork moves forward and is inserted into the pallet holes, the first fork photoelectric sensor detects whether there is an obstacle in the pallet holes.

When the fork is inserted into the pallet holes, the control unit raises the lift (S707), moves the fork rearward (S708) and lowers the lift to a predetermined location (S709), completing the loading task.

The unloading task is performed as follows.

The unloading task refers to a step of unloading the pallet loaded on the fork to the rack as described above.

For the unloading task, rack height information of a location at which the pallet will be unloaded is required. The control unit receives the rack height information from the autonomous forklift truck control server (S801), and raises the lift to the corresponding rack height based on the received rack height information (S802).

The rack includes rack beams arranged at a predetermined spacing, the pallet is loaded on the rack between the rack beams, and to accurately load the pallet onto the rack between the rack beams, a detection process by the third sensor 16 is performed (S803).

As described above, the third sensor 16 is equipped on each of the left/right rear bumpers 17. Accordingly, the location of the rack beams is detected by the detection of reflective patches pre-placed in the rack beams through the third sensor 16 equipped on each of the left/right rear bumpers 17 (see FIG. 11), and the location of the rack at which the pallet will be loaded is identified by the control unit based on the location information of the rack beams detected by the third sensor.

When the location of the rack at which the pallet will be loaded is identified by the third sensor 16, the control unit moves the fork leftward and rightward to the corresponding location (S804). Subsequently, the control unit measures the distance between the autonomous forklift truck and the rack beam through the third sensor 16 (S805) and places the fork on the rack where the pallet is loaded by moving the fork forward based on the measured distance (S806). Subsequently, the pallet is loaded onto the rack by lowering the lift (S807), the fork is moved rearward (S808), and the lift is lowered (S809), completing the unloading task. In this instance, the presence or absence of an obstacle on the rack during the forward movement of the fork is detected by the second fork photoelectric sensor.

The four unit operations of the autonomous forklift truck, namely, the traveling operation, the rotating operation, the loading operation and the unloading operation have been hereinabove described. Each of the traveling operation, the rotating operation, the loading operation and the unloading operation is independently performed, and the four unit operations may overlap. For example, the loading operation may be performed near the ending time of the rotating operation.

DETAILED DESCRIPTION OF MAIN ELEMENTS

1: Location recognition sensor
2: First sensor
3: Warning lamp
4: Alarm lamp
5: Joystick
6: Touchscreen monitor
7: Manual/automatic manipulation switch
8: Emergency stop switch
9: Second sensor
10: Front shock bumper
11: Wireless transmitter/receiver antenna
12: Fork laser sensor
13: First fork photoelectric sensor
14: Second fork photoelectric sensor
15: Wire sensor
16: Third sensor
17: Rear bumper

What is claimed is:

1. An autonomous forklift truck, comprising:
   a location recognition sensor equipped on top of the autonomous forklift truck to emit a laser and detect a location of the autonomous forklift truck in a traveling operation and a rotating operation of the autonomous forklift truck through a laser scan for a laser reflected by a reflective marking equipped in a structure defining a space of a work area or a laser reflected by a fixed indoor geometrical feature;

a third sensor equipped on each of left and right sides of the autonomous forklift truck to detect whether there is an obstacle on a path of rotation during the rotating operation of the autonomous forklift truck, and detect two rack beams and guide a location where a pallet will be unloaded during an unloading operation;

a fork laser sensor equipped at a location of a lift between two cantilevers that constitute a fork to measure a distance from a rack where the pallet is loaded or a distance from the pallet and emit a laser to a reflective marking for pallet hole detection equipped in the pallet and receive location information and reflectance data of a reflected laser in a loading operation; and a control unit to process sensing signals inputted from all the sensors equipped in a front part and a rear part of the autonomous forklift truck and control a traveling operation, a rotating operation, a loading operation and an unloading operation of the autonomous forklift truck via connection with an autonomous forklift truck control server, wherein the fork laser sensor receives a plurality of location information and reflectance data by repeatedly emitting the laser to the pallet having the reflective marking for pallet hole detection within a predetermined time, the location information is 2-dimensional coordinate information of the location to which the laser is emitted, the reflectance data is quantitative contrast data of the location to which the laser is emitted, and the location information of the location to which the laser is emitted is received together for each reflectance data, and the control unit calculates a location information average by averaging the location information of each reflectance data for reflectance data of a predetermined reference value or above, and identifies the calculated location information average as a location where the reflective marking for pallet hole detection is disposed.

2. The autonomous forklift truck according to claim 1, wherein the third sensor equipped on each of the left and right sides of the autonomous forklift truck detects the two rack beams in the unloading operation, and the control unit identifies a location of the rack between the rack beams where the pallet will be loaded based on location information of the rack beams detected by the third sensor.

3. The autonomous forklift truck according to claim 1, wherein the traveling operation comprises:

a step of receiving, by the control unit, design map based destination node information necessary to travel from the autonomous forklift truck control server, a step of generating, by the control unit, a path to a destination node on a design map based on the received destination node information, and a step of controlling, by the control unit, a driving motor and a steering motor of the autonomous forklift truck to move the autonomous forklift truck along the generated path.

4. The autonomous forklift truck according to claim 1, wherein the rotating operation comprises:

a step of receiving, by the control unit, angle of arrival information from the autonomous forklift truck control server, and a step of controlling, by the control unit, a steering motor based on the angle of arrival information to rotate the autonomous forklift truck by an angle of arrival, and wherein presence or absence of an obstacle on the path of rotation during the rotating operation of the autonomous forklift truck is detected by the third sensor.

5. The autonomous forklift truck according to claim 1, wherein the loading operation comprises:

a step of receiving, by the control unit, rack height information of a location where the pallet is loaded from the autonomous forklift truck control server, a step of detecting a location of a pallet hole, a step of moving the fork leftward and rightward and adjusting a spacing between the two cantilevers that constitute the fork to place the fork in the pallet hole, and a step of measuring a distance between the fork and the pallet hole using the fork laser sensor and inserting the fork into the pallet hole by moving the fork forward based on the measured distance.

6. The autonomous forklift truck according to claim 1, wherein the unloading operation comprises:

a step of receiving, by the control unit of the autonomous forklift truck, rack height information from the autonomous forklift truck control server and raising the lift to the corresponding rack height based on the received rack height information, a step of identifying a location of the rack where the pallet will be loaded, a step of measuring, by the control unit, a distance between the autonomous forklift truck and the rack beam through the third sensor when the location of the rack where the pallet will be loaded is identified and moving the fork leftward, rightward and forward based on the measured distance to place the fork on the rack where the pallet will be loaded, and a step of loading the pallet onto the rack by lowering the lift, and wherein the step of identifying the location of the rack where the pallet will be loaded comprises detecting the two rack beams by the third sensor equipped on each of the left and right sides of the autonomous forklift truck, and identifying, by the control unit, the location of the rack between the rack beams where the pallet will be loaded based on the location information of the rack beams detected by the third sensor.

7. The autonomous forklift truck according to claim 1, further comprising:

a first sensor equipped on bottom of the front part of the autonomous forklift truck to detect an obstacle on a work area floor; and a second sensor equipped on top of the front part of the autonomous forklift truck to detect an obstacle at a predetermined height from the floor.

8. The autonomous forklift truck according to claim 1, further comprising:

a first fork photoelectric sensor and a second fork photoelectric sensor equipped on a front side of each of the cantilevers that constitute the fork, wherein the first fork photoelectric sensor is positioned at a center of an attachment, and the second fork photoelectric sensor is positioned on an outer side of the attachment, and the first fork photoelectric sensor detects whether there is a pallet hole in the loading operation, and the second fork photoelectric sensor detects whether there is an obstacle in front of the fork during forward movement of the fork in the unloading operation.

9. The autonomous forklift truck according to claim 1, further comprising:
a first wire sensor to measure a height of the lift, a second wire sensor to measure a shifted location when the two cantilevers are shifted leftward or rightward, and a third wire sensor to measure a forward movement distance of the fork.

* * * * *